US009313083B2

(12) United States Patent
Chhaochharia et al.

(10) Patent No.: US 9,313,083 B2
(45) Date of Patent: Apr. 12, 2016

(54) PREDICTIVE CACHING OF GAME CONTENT DATA

(75) Inventors: Nikhil Chhaochharia, Bangalore (IN); Hariharan Ramasangu, Bangalore (IN); George Paulose Koomullil, Bangalore (IN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 336 days.

(21) Appl. No.: 13/576,339

(22) PCT Filed: Mar. 9, 2012

(86) PCT No.: PCT/IB2012/051103
§ 371 (c)(1),
(2), (4) Date: Jul. 31, 2012

(87) PCT Pub. No.: WO2013/084078
PCT Pub. Date: Jun. 13, 2013

(65) Prior Publication Data
US 2013/0151651 A1   Jun. 13, 2013

(30) Foreign Application Priority Data
Dec. 9, 2011 (IN) ............................. 4298/CHE/2011

(51) Int. Cl.
*G06F 15/167* (2006.01)
*H04L 29/06* (2006.01)
(52) U.S. Cl.
CPC .... *H04L 29/06517* (2013.01); *H04L 29/06523* (2013.01)
(58) Field of Classification Search
CPC ............ H04L 29/06523; H04L 29/06517
USPC ........................................................ 709/214
See application file for complete search history.

(56) References Cited

U.S. PATENT DOCUMENTS

| 4,894,774 A | 1/1990 | McCarthy et al. |
| 6,868,439 B2 | 3/2005 | Basu et al. |

(Continued)

FOREIGN PATENT DOCUMENTS

| JP | 10289219 A | 10/1998 |
| JP | 2000209258 A | 7/2000 |

(Continued)

OTHER PUBLICATIONS

Chan et al., "Motion Prediction for Caching and Prefetching in Mouse-Driven DVE Navigation," ACM Transactions on Internet Technology, vol. 5, No. 1, Feb. 2005, pp. 71-91.

(Continued)

*Primary Examiner* — Kevin Bates
*Assistant Examiner* — Nazia Naoreen
(74) *Attorney, Agent, or Firm* — Turk IP Law, LLC (57) ABSTRACT

Technologies are generally described for reducing lag time via, predictive caching in cloud-based gaming. In one example, a cloud-based gaming system may identify game paths that can be taken during real-time game play and may break down the game paths into subsets of path segments a player can select. The system may determine a probability of the player taking a subset of the path segments based on real-time actions by the player and a game history of the current player and past players. The system may assign probabilities of being selected to the subsets of path segments and may render the subsets of path segments based on their respective probabilities. The system may transmit the rendered game content data for the subsets of path segments to a game client for caching on the local cache so that the game content data may be available when needed during real-time game play.

18 Claims, 7 Drawing Sheets

(56) References Cited

U.S. PATENT DOCUMENTS

| | | | |
|---|---|---|---|
| 7,240,162 | B2 | 7/2007 | de Vries |
| 7,515,156 | B2 | 4/2009 | Tinker et al. |
| 7,934,058 | B2 | 4/2011 | Hawkins et al. |
| 8,554,526 | B2 | 10/2013 | Andersen et al. |
| 8,632,407 | B2 * | 1/2014 | Gelman .................. G07F 17/32 463/40 |
| 2006/0052168 | A1 | 3/2006 | Shancham |
| 2006/0160607 | A1 | 7/2006 | Okada |
| 2008/0039208 | A1 | 2/2008 | Abrink et al. |
| 2010/0161348 | A1 | 6/2010 | Lindell et al. |
| 2010/0161384 | A1 | 6/2010 | Wells |
| 2011/0053693 | A1 | 3/2011 | Wright |
| 2011/0162005 | A1 | 6/2011 | Yerli |
| 2011/0300933 | A1 | 12/2011 | Chien et al. |

FOREIGN PATENT DOCUMENTS

| | | | |
|---|---|---|---|
| JP | 2006501535 | A | 1/2006 |
| JP | 2010079462 | A | 4/2010 |

OTHER PUBLICATIONS

Chen et al., "Quantifying QoS Requirements of Network Services: A Cheat-Proof Framework" MMSys'11, Feb. 23-25, 2011, San Jose, California Institute of Information Science, 2011; 12 pages.

International Search Report and Written Opinion, PCT/IB2012/051103 filed Mar. 9, 2012, mailed Jun. 4, 2012.

Correa, W. T., et al., "Visibility-Based Prefetching for Interactive Out-Of-Core Rendering," PVG '03 Proceedings of the 2003 IEEE Symposium on Parallel and Large-Data Visualization and Graphics, pp. 1-8 (Oct. 20-21, 2003).

International Search Report and Written Opinion for PCT/US11/60164, mailed Apr. 10, 2012.

Lau, R. W. H., and Chan, A., "Motion Prediction for Online Gaming," Motion in Games Lecture Notes in Computer Science, vol. 5277, pp. 104-114 (2008).

Sakr, S., "Shocker! Gamer behal.1or is actually quite predictable," accessed at https://web.archive.org/web/20111231082530/http://www.engadget.com/2011/06/14/shocker-gamer-behavior-is-actually-quite-predictable/, posted on Jun. 14, 2011, pp. 4.

Shi, S., et al., "Using graphics rendering contexts to enhance the real-time video coding for mobile cloud gaming," MM '11 Proceedings of the 19th ACM international conference on Multimedia, pp. 103-112 (2011).

Office Action received for U.S. Appl. No. 14/476,648, mailed Jun. 12, 2015 and filed Sep. 3, 2014.

"A little bit different network technology to support the game", Network Magazine May issue, ASCII Corporation, May 1, 2003, vol. 8, No. 5, 1 page, paragraph translation of the literature indicating the well-known technology.

* cited by examiner

COMPUTER PROGRAM PRODUCT 700

SIGNAL BEARING MEDIUM 702

704 AT LEAST ONE OF

ONE OR MORE INSTRUCTIONS FOR STORING GAME PLAY USAGE HISTORY ON A CLOUD-BASED GAME SERVER;
    ONE OR MORE INSTRUCTIONS FOR IDENTIFYING AVAILABLE PATH SEGMENTS;
    ONE OR MORE INSTRUCTIONS FOR DETERMINING PROBABILITY OF SUBSET OF PATH SEGMENTS;
    ONE OR MORE INSTRUCTIONS FOR RENDERING ONE OR MORE OF THE SUBSET OF PATH SEGMENTS;
    ONE OR MORE INSTRUCTIONS FOR TRANSMITTING RENDERED SEGMENT(S) TO GAME CLIENT;
    ONE OR MORE INSTRUCTIONS FOR UPDATING PROBABILITY BASED ON PLAYER ACTIONS, HISTORY, ETC.; AND
    ONE OR MORE INSTRUCTIONS FOR UPDATING GAME CLIENT CACHE WITH NEW GAME CONTENT.

| COMPUTER-READABLE MEDIUM 706 | RECORDABLE MEDIUM 708 | COMMUNICATIONS MEDIUM 710 |

FIG. 7

PREDICTIVE CACHING OF GAME CONTENT DATA

CROSS-REFERENCE TO RELATED APPLICATIONS

This Application is the National Stage filing under 35 U.S.C §371 of PCT Application Ser. No. PCT/IB12/51103 filed in Mar. 9, 2012, which claims priority under 35 U.S.C. 0119 (b) to India Application Ser. No. 4298/CHE/2011 filed on Dec. 9, 2011. The disclosures of the PCT Application and the foreign patent application are hereby Incorporated by reference in their entireties.

BACKGROUND

Unless otherwise indicated herein, the materials described in this section are not prior art to the claims in this application and are not admitted to be prior art by inclusion in this section.

The online Massively Multiplayer Online Role-Playing Game (MMORPG) market is growing at a rapid pace. Interactive gaming, in which the user environment on the game client is continually updated in response to user decisions in real time, is becoming a very resource intensive activity in terms of processing, storage, and bandwidth requirements. As first person shooter games are getting combined with real-time strategy, gaining complexity increases multi-fold. Computing environments for gaming are increasingly being moved to cloud-based gaining systems where the game processing is hosted on a cloud-based server and the gaming video streams are transmitted to the local game clients with fairly low processing power. Any delay, latency, or lag time in transmitting the video stream to the local game clients in real time may negatively affect the user experience in cloud-based gaming and it may be desirable to reduce the latency and lag time in transmitting the game video stream to the local game clients.

One way to improve the user experience and reduce lag time and latency is to generate upcoming video sequences of a game ahead of time and send the video sequences to the game client in advance. Predicting upcoming game sequences for in-advance generation can work well when the number of options is fewer in number, however complex interactive MMORP games, such as first person shooter and real-time strategy games, are very interactive and dynamic in nature, and it is extremely difficult, if not impossible to predict user actions and upcoming game streams in advance.

SUMMARY

The present disclosure generally describes technologies for predictive caching of game content data in cloud-based gaming. According to some examples, a method for predictive caching in cloud-based game may include identifying a plurality of path segments that can be taken by a player during a game, determining a probability of the player taking a subset of the path segments based on at least one from a set of: a first action by the player, a game history of the player, and/or a game history of a plurality of players, rendering one or more of the path segments in the subset of path segments based on their respective probabilities, and transmitting the rendered one or more path segments to a game client to be cached at the game client.

According to other examples, cloud-based game server for predictively caching game content data may include a memory, a processor coupled to the memory. The processor may be configured to identify a plurality of path segments that can be taken by a player during a game, determine a probability of the player taking a subset of the path segments based on at least one from a set of: a first action by the player, a game history of the player, and/or a game history of a plurality of players, render one or more of the path segments in the subset of path segments based on their respective probabilities, and transmit the rendered one or more path segments to a game client to be cached at the game client.

According to further examples, a computer-readable storage medium may have instructions stored thereon for predictive caching in cloud-based game. The instructions may include identifying a plurality of path segments that can be taken by a player during a game, determining a probability of the player taking a subset of the path segments based on at least one from a set of: a first action by the player, a game history of the player, and/or a game history of a plurality of players, rendering one or more of the path segments in the subset of path segments based on their respective probabilities, and transmitting the rendered one or more path segments to a game client to be cached at the game client.

According to yet other examples, a game client for caching predicted game content data may include a memory and a processor coupled to the memory. The processor may be configured to receive one or more rendered path segments from a game server for caching locally. The path segments may be rendered by identifying a plurality of path segments that can be taken by a player during a game, determining a probability of the player taking a subset of the path segments based on at least one from a set of: a first action by the player, a game history of the player, and/or a game history of a plurality of players, and rendering the one or more of the path segments in the subset of path segments based on their respective probabilities.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the Subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to predictive caching of game content data in cloud-based gaming.

Briefly stated, technologies are presented for reducing lag time via predictive caching in cloud-based gaming. A cloud-based gaming system may identify game paths that can be taken during real-time game play and may break down the game paths into subsets of path segments a player can select. The system may determine a probability of the player taking a subset of the path segments based on an analysis of real-time actions by the player and a game history of the current player and past players. The system may assign probabilities of being selected to the subsets of path segments and may render the subsets of path segments based on their respective probabilities. The system may transmit the rendered game content data for the subsets of path segments to a game client for caching on the local cache so that the game content data may be available when needed during real-time game play.

Figure 1:
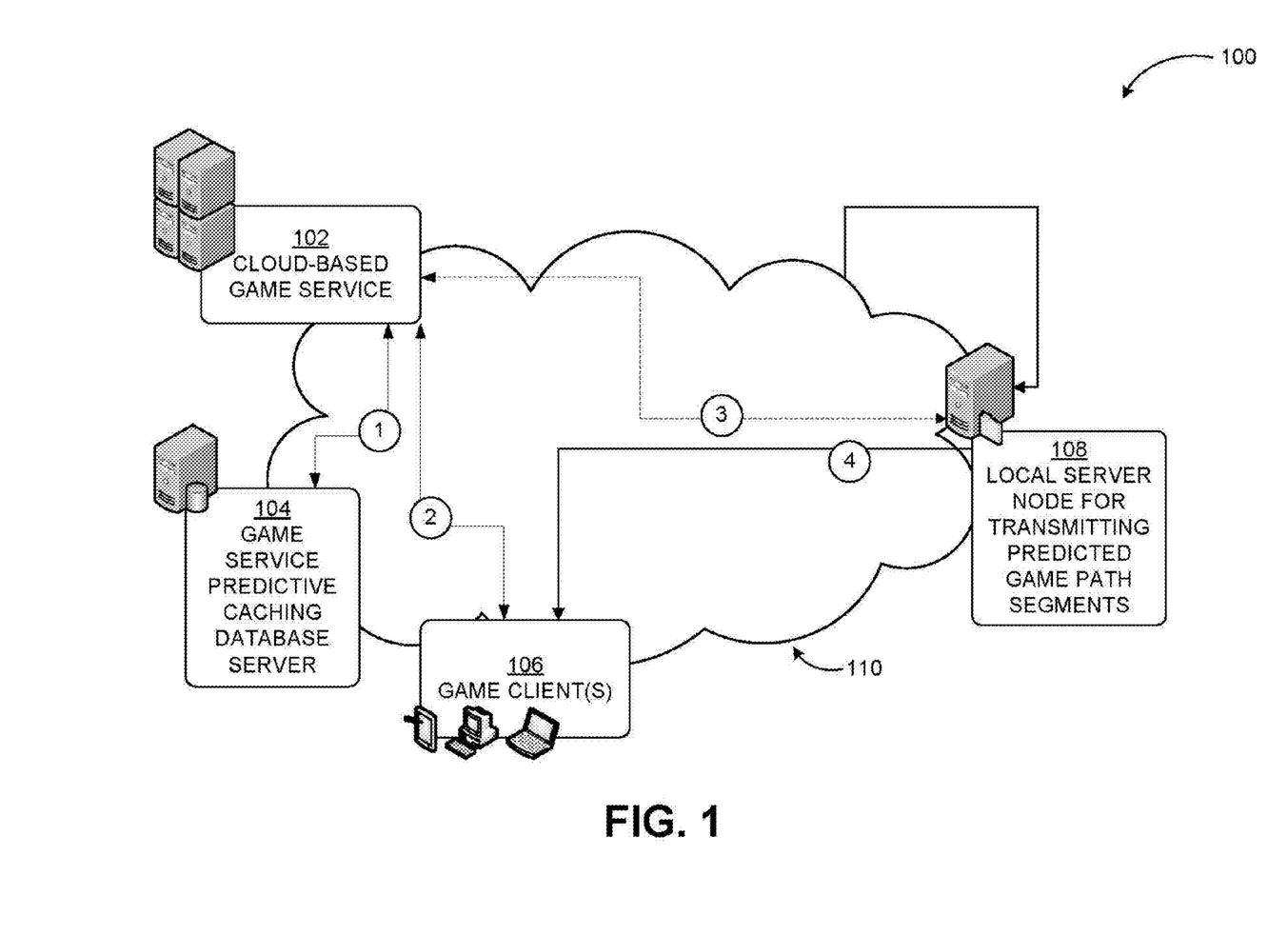
FIG. 1 illustrates an example cloud-based game system for predictive caching.

FIG. 1 illustrates an example cloud-based game system for predictive caching, arranged in accordance with at least some embodiments described herein. As shown in a diagram 100 in FIG. 1, a cloud-based system may include a cloud-based game service 102, which may be implemented on one or more physical computing devices. The cloud-based game service 102 may provide game content data to one or more game clients 106 over a cloud-based network 110 via network pathways 2. The cloud-based game service 102 may be coupled via network pathways 1 to a game service predictive caching database server 104. In some example embodiments, the game service predictive caching database server 104 may predict likely game path segments a user or current game player may be likely to pursue while playing a game on one or more of the game clients 106. The game service predictive caching database server 104 may enable the cloud-based game service 102 to predictively cache game content data for likely game path segments on the one or more game clients 106 via the network pathways 2 in order to reduce lag time for rendering game content data during real-time game play.

In other examples, a local server node 108 may further reduce latency and lag time for transmitting predicted game path segments to the one or more game clients 106 via network pathways 4. For example, the local server node 108 may reduce lag time for predictively caching game content data for likely game path segments on the one or more game clients 106 by being located physically closer to some of the game clients 106 than the cloud-based game service 102. The local server node 108 may also reduce lag time for predictively caching game content data by easing the computational load on the cloud-based game service 102. The local server node 108 may also reduce lag time for predictively caching game content data by easing the network load on the cloud-based network 110. The local server node 108 may communicate with the cloud-based game service 102 optionally via network paths 3.

Figure 2:
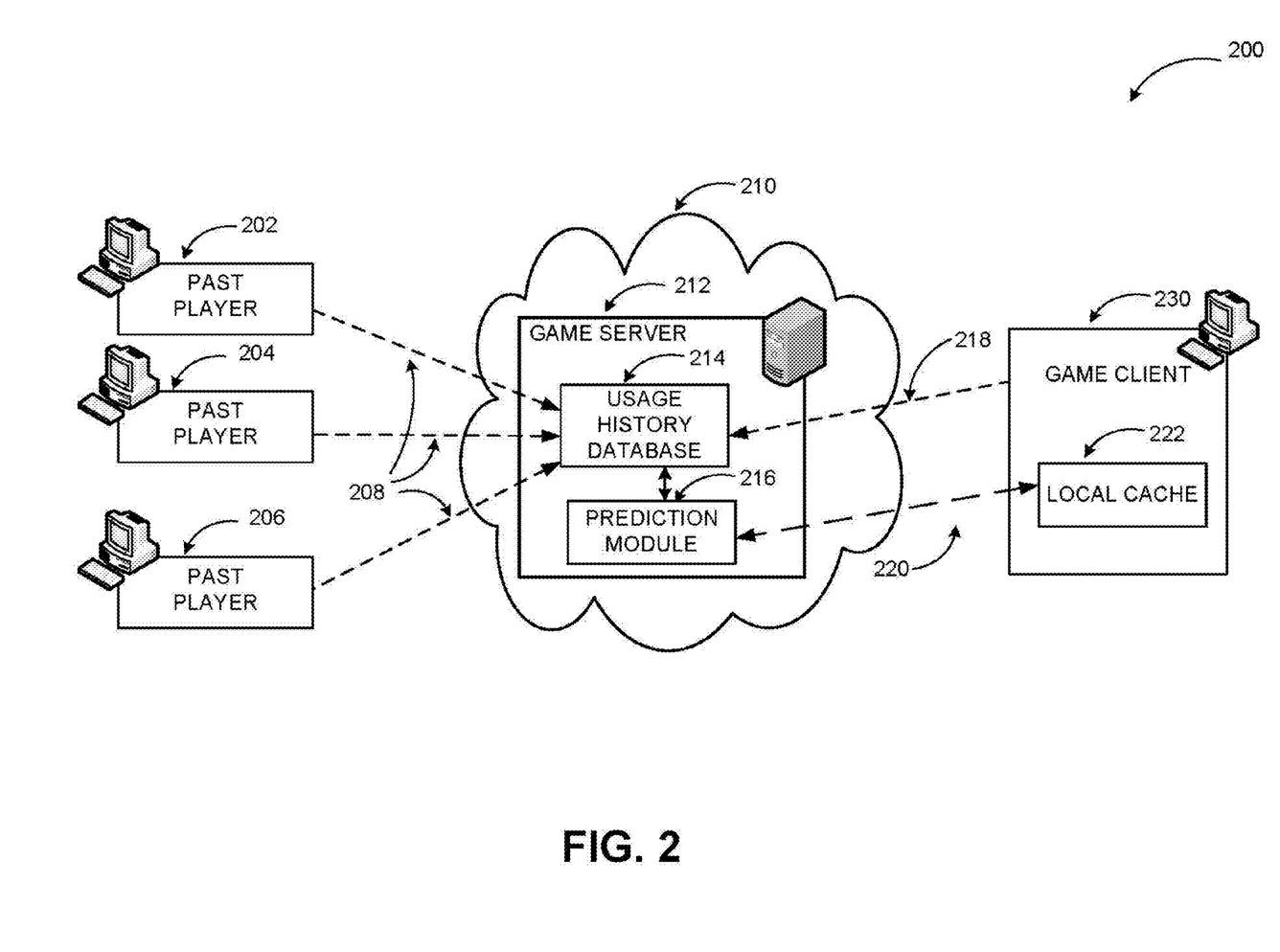
FIG. 2 illustrates an example cloud-based game system for predictive caching based on usage history.

FIG. 2 illustrates an example cloud-based game system for predictive caching based on usage history, arranged in accordance with at least some embodiments described herein. As demonstrated in a diagram 200, a cloud-based gaining system 210 may be configured to predict and transmit (220) relevant game content data to a game client 230 in order to reduce latency and lag dine experienced by a game player during real-time game play. An example game may include a first person shooter and/or may be a real-time strategy interactive game in which the user environment on the game client is updated in response to user decisions in real time.

In a system according to embodiments, a game server 212 within the cloud-based gaming system 210 may be utilized for predictively caching game content data on a local cache 222 at the game client 230 so that the game content data is available when needed during real-time game play. The game server 212 may monitor game play activity by a current player on the current player's game client 230. When the current player begins a game on the game client 230, there may be a number of game paths the player can take to get from the game entry point to the game exit point, and the game server 212 may be configured to identify the available game paths the player can take. The game server 212 may further break down the identified game paths into smaller path segments that the current player can select to take, such that each game path from entry point to exit point may be a combination of a subset of selected path segments. The subset of selected path segments may be part of more than one available game path from game entry to game exit.

In an example embodiment, the game server 212 may be configured to predict the most probable path segments the current player may select to take on the game client 230 through a prediction module 216. The prediction module 216 may determine a probability of the current player taking a subset of the path segments based on the real-time actions of the current player. For example, the prediction module 216 may determine the current player's path segment location and may identify which path segments are available for the current player to next select. The prediction module 216 may then identify the current player's real-time actions and path segment selections and may determine the probability of being selected next for one or more of the available upcoming path segments based on the current player's real-time game play decisions.

In an additional embodiment, the game server 212 may be configured to enable the prediction module 216 to determine the probability of the current player selecting a particular subset of the path segments based on game play history of the current player and game play history of past players 202, 204, 206. The game server 212 may be configured to track (208) the game play history, including actions, behaviors and path segments selections, of the one or more past players 202, 204, 206, and to store the game play history of the past players 204, 206, 208 in a usage history database 214 located on the game server 212. In some embodiments, the game server 212 may be configured to track (218) the game play history of the current player, including the current player's actions, behaviors and path segments selections, and to store the current player's game play history in the usage history database 214, as well.

In an example embodiment, the prediction module 216 may utilize data mining and crowdsourcing techniques for analyzing the game play history of the past players and the current player stored in the usage history database 214 in order to determine a probability that the current player will select a particular subset of path segments. Based on the applied data mining and crowdsourcing techniques, the prediction module 216 may assign a probability of being selected next to each available path segment, such that some available path segments may be assigned a high probability of being selected next by the current player, and other available path segments be assigned a lower probability of being selected next by the current player.

Further, the game server 212 may store a set of pre-defined probabilities for path segments that may be specified by a game developer in the game content data, such that the prediction module 216 may determine the probability of the current player taking a particular subset of the path segments based on the pre-defined probabilities specified by the game developer upon initial game setup. In some embodiments, the prediction module 216 may determine the probability of the current player taking a particular subset of the path segments based on the set of pre-defined probabilities stored in the game content data on the game server 212 and periodically updated by a game content data update. The prediction module 216 may assign a probability of being selected to each available path segment based on the pre-defined probabilities stored on the game server 212 in conjunction with the probabilities determined from data mining and crowdsourcing the game play history of the current player and past players stored in the usage history database 214.

In an example embodiment, once the prediction module 216 determines and assigns probabilities of being selected next to available subsets of path segments, the game server 212 may render the game content data for the path segments based on their respective assigned probabilities, and the prediction module 216 may transmit (220) the rendered path segments to the game client 230 to be cached on a local cache 222. In an example scenario, the game server 212 may determine a particular subset of path segments has the highest probability of being selected next by the current player. The game server 212 may render the game content data for the path segment with the highest probability of being selected, and the prediction module 216 may transmit (220) that path segment having the highest probability to the game client 230 to be cached on the local cache 222. In another example, the game server 212 may determine two or more subsets of path segments that have high probabilities of being selected next by the current player, and the game server 212 may render the game content data for the multiple path segments with high probabilities of being selected, and the prediction module 216 may then transmit (220) the multiple high probability path segments to the game client 230 to be cached on the local cache 222.

In a further embodiment, the prediction module 216 may determine the quality and quantity of the path segments to be cached on the local cache 222 of the game client 230 based on the assigned probabilities. For example, the prediction module 216 may transmit (220) the highest probability path segment to the game client to be cached on the local cache 222 in high quality. The quality of the path segment transmitted may be the display quality on the game client, and may include resolution quality, the number of frames per second, rasterization, and shading, as some examples. The prediction module 216 may adjust the resolution, the number of frames per second, the rasterization and the shading in order to adjust the quality of the path segment transmitted to the game clients. The prediction module 216 may also transmit (220) game content data for one or more additional path segments to the game client to be cached on the local cache 222 in varying display qualities in proportion to the assigned probabilities. For example, lower probability path segments may be rendered and transmitted in lower qualities, and higher probability path segments may be rendered and transmitted in higher qualities.

In some embodiments, the prediction module 216 may balance the quantity and quality of path segments transmitted to the local cache 222 on the game client 230. The prediction module 216 may determine the quantity of path segments to transmit to the game client for caching on the local cache 222 based on the available bandwidth for transmission to the game client and the size of the local cache 222, and may accordingly adjust the quality of the transmitted path segments in order to optimize the available transmission bandwidth and space in the local cache 222. For example, in a scenario where there is a low bandwidth and/or small cache size, the prediction module 216 may transmit fewer path segments in higher display qualities, or alternatively, the prediction module 216 may transmit more path segments to the local cache 222 with reduced qualities. In other embodiments, when determining the quantity and quality of path segments to transmit, the prediction module 216 may take into account the number of active players on additional game clients which may be receiving game content data from the game server 212, which may affect the available bandwidth for game content data transmission. Further, in some scenarios, such as when game play history for the current player and/or past players may not be available, or if the prediction module 216 is not able to calculate useful probabilities, the prediction module 216 may evenly distribute the probability of being selected next between available path segments, and may transmit game content data for path segments in approximately evenly distributed qualities to the game client.

In a further embodiment, the game server 212 may continuously monitor and track the current player's real-time game play on the game client 230, and may update the probabilities of the current player selecting a next subset of path segments based on real-time decisions made by the current player. In some embodiments, the game server may update the probabilities based on game play history of the current player and past players 202, 204, 206 stored in the usage history database 214. For example, once the current player makes a path segment selection and the current path segment content data has been retrieved by the game client 230 from the local cache 222, the game server 212 may enable the prediction module 216 to identify the current player's new path segment location and to identify subsets of path segments that may available for the current player to select next. The prediction module 216 may re-determine the probability of being selected for the one or more of the available upcoming path segments based on the current player's real-time game play decisions, the game play history of the current player, and the game play history of past players 202, 204, 206. Once the prediction module 216 determines and assigns probabilities of being selected next to the next available subsets of path segments, the game server 212 may render the game content data for the new next available subsets of path segments based on their respective assigned probabilities, and the prediction module 216 may transmit (220) the newly rendered path segments to the game client 230 to be cached on the local cache 222. The local cache 222 may be updated such that the unused game content data from the previous subset of path segments may be removed and replaced with the newly rendered game content data for the predicted next subset of path segments.

Figure 3:
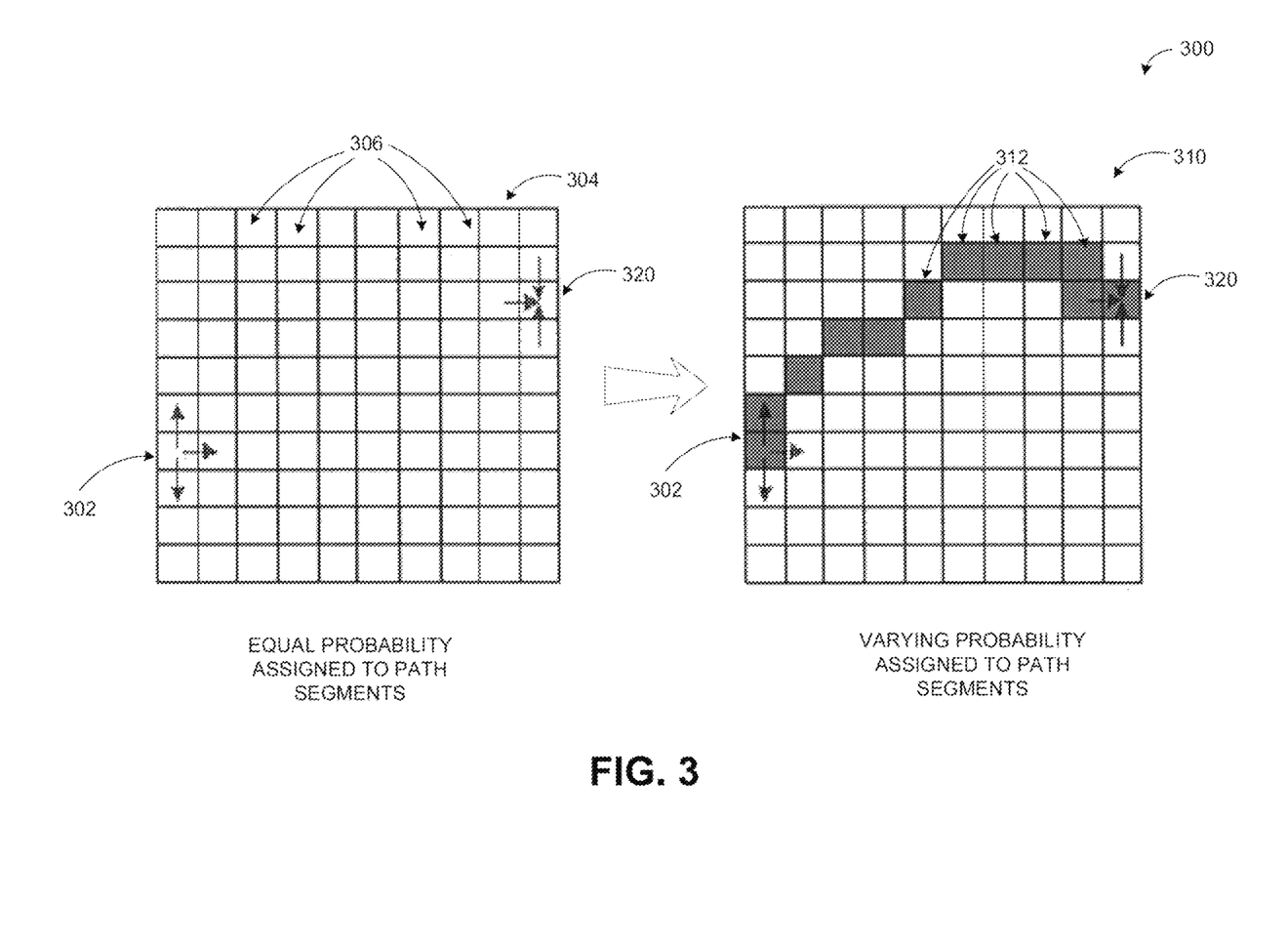
FIG. 3 illustrates an example scenario of assigned probabilities to segments of a multi-path game.

FIG. 3 illustrates an example scenario of assigned probabilities to segments of a multi-path game, arranged in accordance with at least some embodiments described herein. As discussed previously in conjunction with FIG. 2, a diagram 304 illustrates a scenario including a substantially equal probability of being selected next for each path segments 306. Upon startup of a game by a current player on the game client 230, the game server 212 may monitor the current player's game play activity as the player navigates from a game entry point 302 to a game exit point 320. Several game paths may exist that the current player may take to navigate from the game entry point 302 to the game exit point 320, and the game server 212 may initially identify the available game paths that the current player can select. The game server 212 may break down the identified available game paths into several smaller game path segments 306 that the current player can select to take while navigating the game, such that each game path from the game entry point 302 to the game exit point 320 may be a combination of a subset of selected available path segments. In some embodiments, the selected subset of path segments may be part of more than one available game path from the game entry point 302 to the game exit point 320.

In an example embodiment, the game server 212 may be configured to predict the most probable subset of path segments the current player may select to take to navigate from the game entry point 302 to the game exit point 320. Through a prediction module, the game server may assign a probability of being selected next by the current player to each of the path segments. In an example scenario, as demonstrated in a diagram 300, upon initiation of the game by the current player, the game server may initially assign a substantially equal probability of being selected next to each of the path segments 306. In such a scenario, the game server may render the game content data for the path segments 306 in substantially equal qualities, and may transmit the game content data for the path segments 306 having substantially equal probability to the local cache on the game client. In some embodiments, the game server may evenly distribute the probability of being selected next between the available path segments 306 in some scenarios, such as when game play history for the current player and/or past players may not be available, or if useful probabilities are not able to be calculated.

In another diagram 310, the game server may assign varying probabilities of being selected next by the current player to each of the path segments 312. The game server 212, through a prediction module, may be configured to determine the probabilities of being selected next for each of the available path segments 312. Based on current game player actions, current player game play history, and past player game play history, the game server 212 may determine that certain path segments have a higher probability of being selected next by the current player while other path segments may have a lower probability of being selected next. The prediction module may determine the probabilities and assign the varying probabilities to the path segments 312, and once the probabilities have been assigned to the path segments 312, the game server 212 may render the game content data for path segments 312 having higher probabilities and may transmit the game content data for the higher probability path segments 312 to the game client for caching on the local cache. As discussed previously, the game server 212 may adjust the quality of the transmitted game content data for the path segments 312 and the number of transmitted path segments for transmitting to the game client in order to optimize factors including the available bandwidth and local cache size.

The game entry and exit points, as well as, the path segments in the diagram 300 are not meant to represent actual paths in a game that are walked or covered through a vehicle controlled by a player. The game entry and exit points may simply represent a starting state for the player and an end state. Similarly, each path segment may represent a particular player state at a given time within the game.

Figure 4:
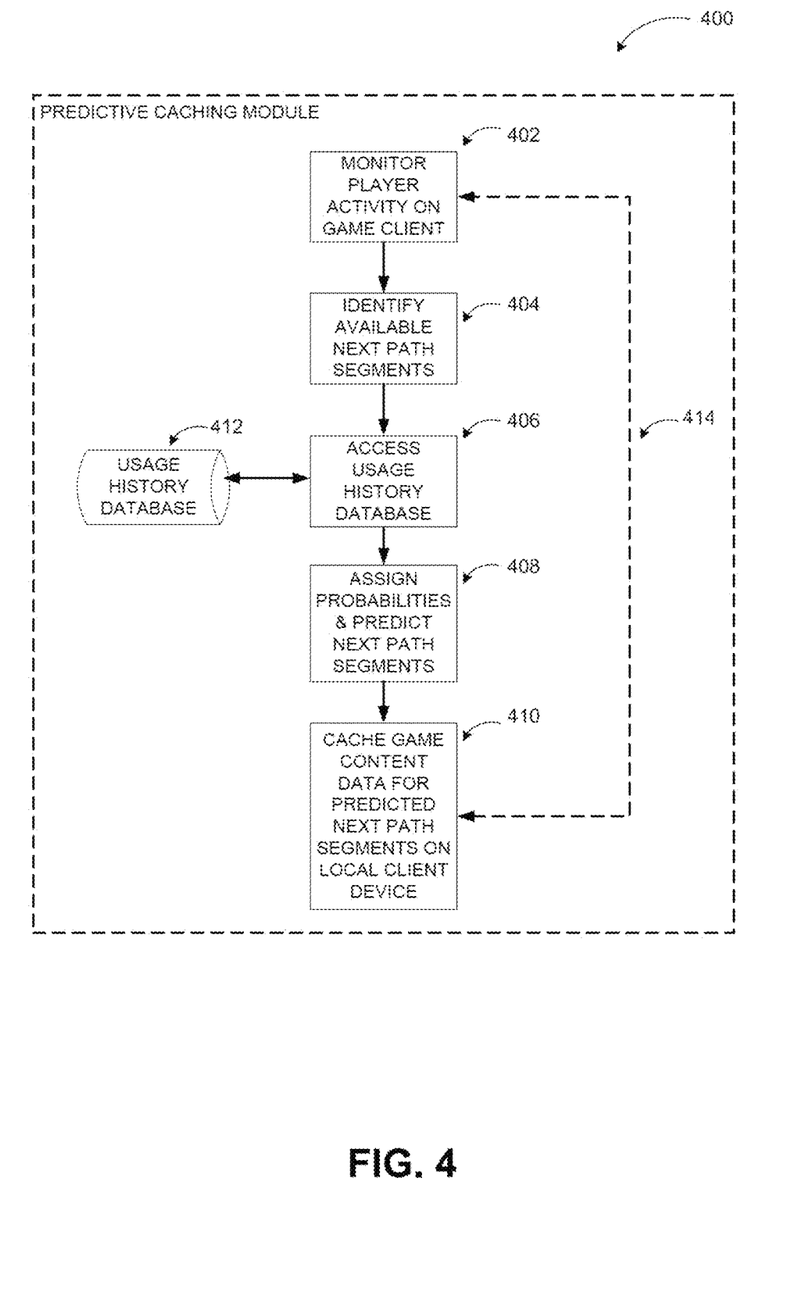
FIG. 4 illustrates a functional block diagram of dynamically updating probabilities for predictively caching path segments in a multi-path game.

FIG. 4 illustrates a functional block diagram of dynamically updating probabilities for predictively caching path segments in a multi-path game, arranged in accordance with at least some embodiments described herein. As demonstrated in a diagram 400, upon initiation of a game by a current player on the current player's game client, a game server in a cloud-based gaining system may monitor (402) the current player activity on the game client, including the current player's real-time actions, decisions and path segment selections. Through a predictive caching module, the game server may identify the current player's path segment location and may identify which path segments are available for the current player to select directly next (404).

The game server may predict which path segments the current player may select to take next by determining the probability of being selected based on the current player's real-time game play decisions, game play history of the current player, and game play history of past players, which may include a history of current and past players' actions, behaviors and path segments selections. In order to determine the probabilities, the game server may access (406) a usage history database 412 located on the game server, which may store the game play history of the current player and the game play history of past players. The game server may be configured to apply data mining, crowdsourcing, and other similar data gathering and analysis techniques in order to determine the probabilities of being selected next based on the game play history, and the game server may assign (408) the determined probabilities of being selected next to each of the identified available path segments.

Once the game server determines and assigns (408) probabilities of being selected next to available path segments, the game server may render the game content data for the path segments based on the respective assigned probabilities and may transmit the rendered game content data for the path segments to the game client where the game content data may be cached (410) on the local cache of the game client. The game server may continuously monitor the current player's activity and path segment selection in real-time, such that as the player selects a path segment, the game server may continuously update (414) the probabilities of being selected next for future upcoming path segments.

Figure 5:
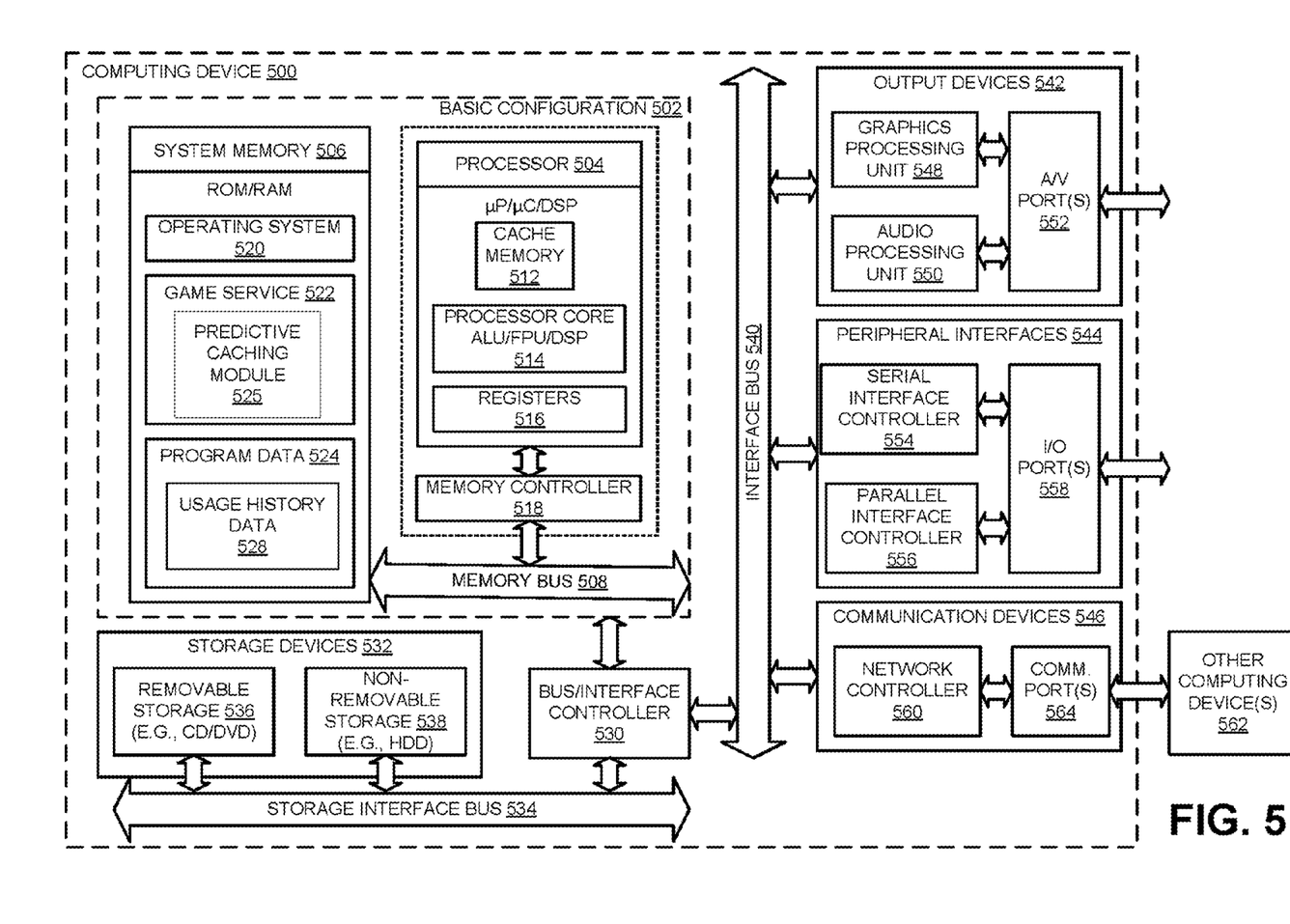
FIG. 5 illustrates a general purpose computing device, which may be used to implement predictive caching in a cloud-based game.

FIG. 5 illustrates a general purpose computing device, which may be used to implement predictive caching in a cloud-based game, arranged in accordance with at least some embodiments described herein. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (μP), a microcontroller (μC), a digital signal processor (DSP), or any combination thereof. The processor 504 may include one more levels of caching, such as a cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more game service applications 522, and program data 524. The game service applications 522 may include a predictive module 525, which may provide predictive caching of game content data for path segments having high determined probabilities of being selected next by a game player during real-time game play as described herein. Referring again to FIG. 5, the program data 524 may include, among other data, usage history data 528 associated with the game play history of the current player and past players as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include the game clients 106, the local server node 108, and/or the the game service predictive caching database server 104 as depicted in FIG. 1.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other examples, the human interaction can be automated such as by pre-selected criteria that may be machine automated.

Figure 6:
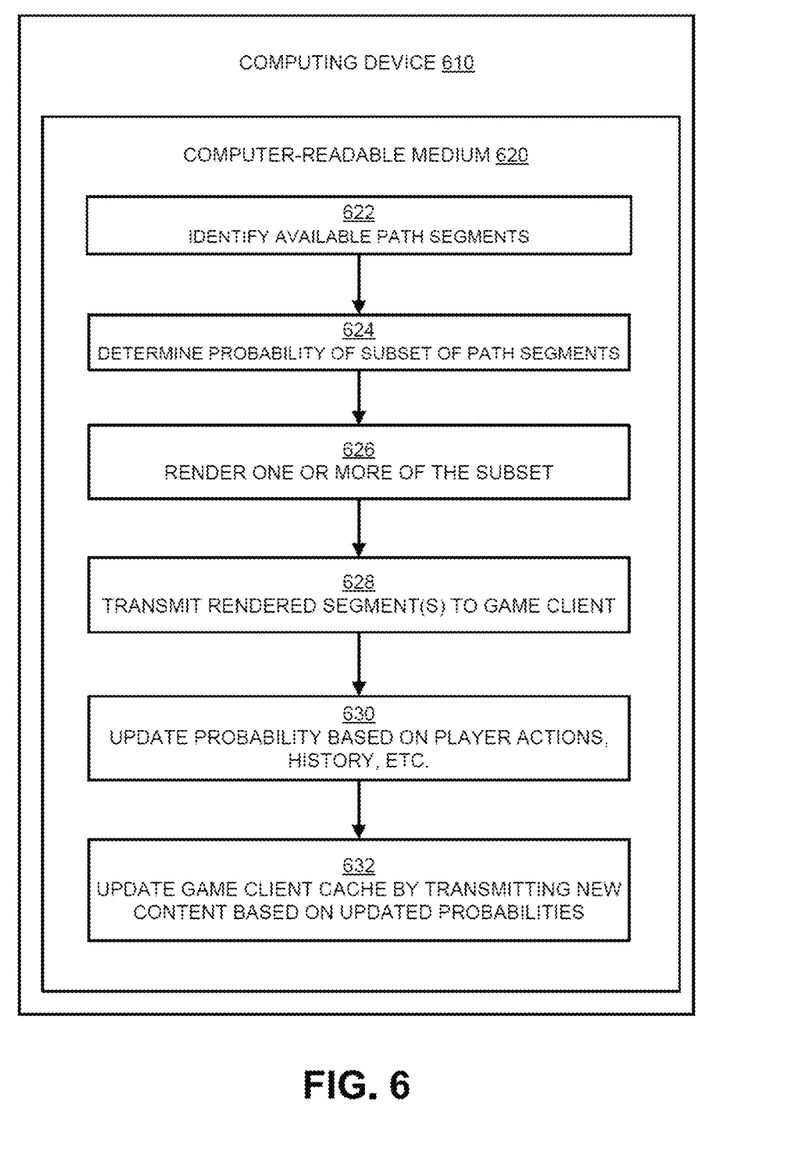
FIG. 6 is a flow diagram illustrating an example method for predictive caching in a cloud-based game that may be performed by a computing device such as the device in FIG. 5.

FIG. 6 is a flow diagram illustrating an example method for predictive caching in a cloud-based game that may be performed by a computing device such as the device in FIG. 5, arranged in accordance with at least some embodiments described herein. Example methods may include one or more operations, functions or actions as illustrated by one or more of blocks 622, 624, 626, 628, 630, and/or 632. The operations described in the blocks 622 through 632 may also be stored as computer-executable instructions in a computer-readable medium such as a computer-readable medium 620 of a computing device 610.

An example process of predictive caching in cloud-based gaming may begin with block 622, "IDENTIFY AVAILABLE PATH SEGMENTS", where the game server such as the game server 212 of FIG. 2 may monitor game play activity by a current player, identify available game paths the current player may take to navigate from a game entry point to a game exit point, and break down the available game paths into subsets of path segments that the current player may select.

Referring again to FIG. 6, block 622 may be followed by block 624, "DETERMINE PROBABILITY OF SUBSET OF PATH SEGMENTS," where the game server 212 may determine and assign to the subsets of available path segments a probability of being selected next. Block 624 may be followed by block 626, "RENDER ONE OR MORE OF THE SUBSET." At block 626, the game server 212 may render the game content data for the subset of path segments in display qualities that may be proportional to the determined probabilities. Block 626 may be followed by block 628, "TRANSMIT RENDERED SEGMENT(S) TO GAME CLIENT," where the game server 212 may transmit the rendered segments to the current player's game client 230 for caching on the local cache of the game client 230.

Block 628 may be followed by block 630, "UPDATE PROBABILITY BASED ON PLAYER ACTIONS, HISTORY, ETC," where the game server 212 may adjust and update the initially assigned probabilities based on real-time actions by the current player, game play history of the current player, and game play history of past players. Block 630 may be followed by block 632, "UPDATE GAME CLIENT CACHE BY TRANSMITTING NEW CONTENT BASED ON UPDATED PROBABILITIES", where the game server may render the game content data for the path segments with newly updated probabilities and may transmit the newly rendered game content data to the game client for caching on the local cache of the game client 230.

The functions performed at the blocks in the above described process are for illustration purposes. Predictive caching in cloud-based gaming may be implemented by similar processes with fewer or additional functions. In some examples, the functions may be performed in a different order. In some other examples, various functions may be eliminated. In still other examples, various functions may be divided into additional functions, or combined together into fewer functions.

Figure 7:
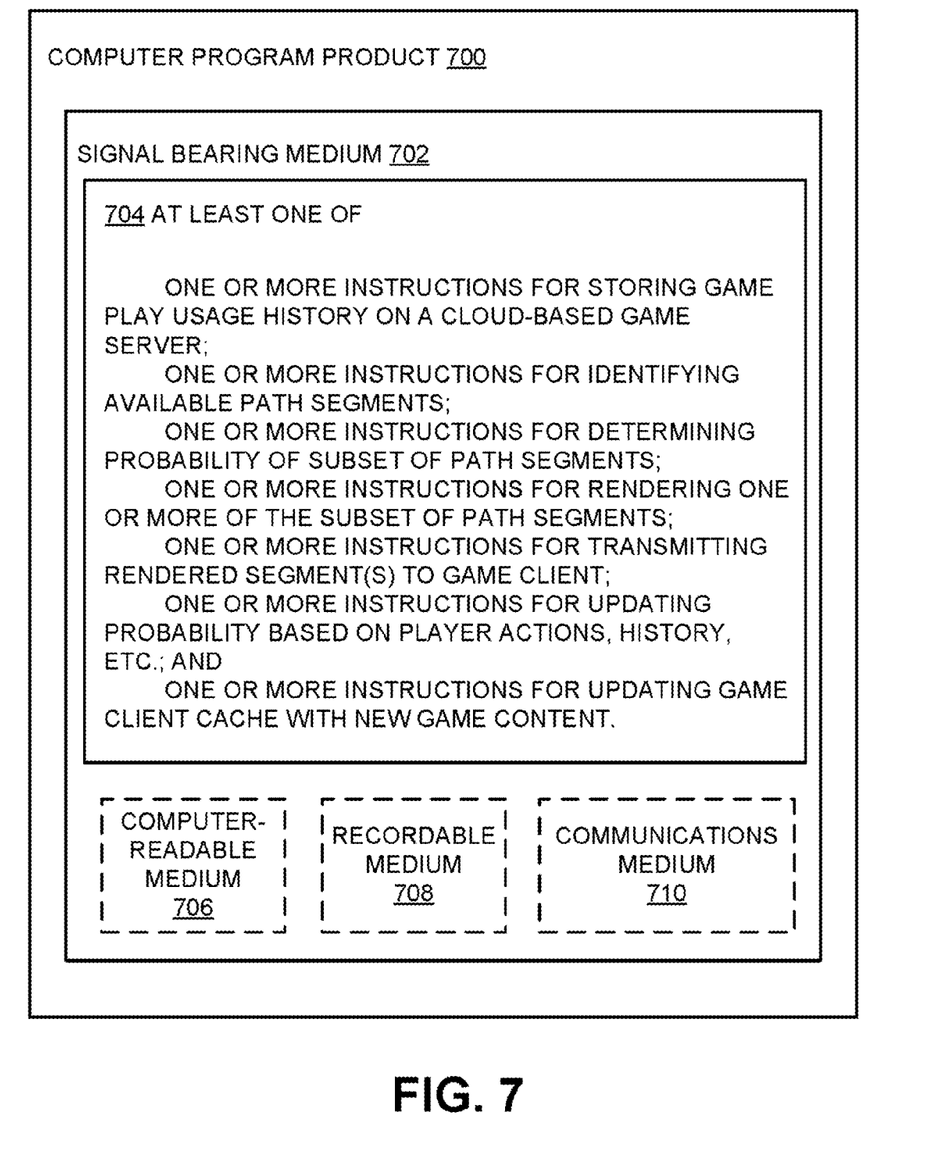
FIG. 7 illustrates a block diagram of an example computer program product, all arranged in accordance with at least some embodiments described herein.

FIG. 7 illustrates a block diagram of an example computer program product 700, arranged in accordance with at least some embodiments described herein. In some examples, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the predictive caching module 525 may undertake one or more of the tasks shown in FIG. 7 in response to the instructions 704 conveyed to the processor 504 by the signal bearing medium 702 to perform actions associated with predictive caching in cloud-based gaming as described herein. Some of those instructions may include, for example, instructions for storing game play usage history on a cloud-based game server; instructions for identifying available path segments; instructions for determining the probability of a subset of path segments; instructions for rendering one or more of the subset of path segments; instructions for transmitting rendered path segments to a game client; instructions for updating the probability based on player actions, history, etc; and instructions for updating the game client cache with new game content.

In some implementations, the signal bearing medium 702 depicted in FIG. 7 may encompass a computer-readable medium 706, such as, but not limited to, a hard disk drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the computer program product 700 may be conveyed to one or more modules of the processor 504 by an RF signal bearing medium, where the signal bearing medium 702 is conveyed by the wireless communications medium 710 (e.g., a wireless communications medium conforming with the IEEE 802.11 standard).

According to some examples, a method for predictive caching in cloud-based game may include identifying a plurality of path segments that can be taken by a player during a game, determining a probability of the player taking a subset of the path segments based on at least one from a set of: a current action by the player, a location of the player, a first action by the player, a game history of the player, a game history of a plurality of players, and/or a first action by the plurality of players, rendering one or more of the path segments in the subset of path segments based on their respective probabilities, and transmitting the rendered one or more path segments to a game client to be cached at the game client.

According to some examples, the method may include transmitting a path segment with a highest probability.

According to other examples, the method may include rendering the one or more path segments with varying display quality in proportion to their respective probabilities, and transmitting the one or more path segments with the varying display quality. The display quality may include at least one from a set of: a resolution, a number of frames per second, a rasterization, and/or a shading.

According to some examples, the method may include selecting a number of rendered path segments to transmit based on at least one from a set of: an available bandwidth, a size of game client cache, and/or a number of active players.

According to further examples, the method may include updating a probability of the player taking another subset of the path segments based on at least one from a set of: another action by the player, another location of the player, the game history of the player, and/or the game history of a plurality of players as the player progresses through the game, rendering one or more of the path segments in the other subset of path segments based on their respective probabilities, and transmitting the rendered one or more path segments to the game client to be cached at the game client.

According to further examples, the method may include employing data mining or crowdsourcing the game history of the plurality of players to identify the path segments and/or to determine the probability.

According to some examples of a method for predictive caching in cloud-based game, determining the probability of the player taking the subset of the path segments may be based on a set of pre-defined probabilities specified by a game developer and stored in game content data upon initial game setup.

According to other examples of a method for predictive caching in cloud-based game, determining the probability of the player taking the subset of the path segments is further based on a set of pre-defined probabilities stored in game content data and updated by a game content update.

According to further examples, the method may include removing unused game content data from a cache on the game client, and replacing the unused game content data with game content data for a new set of one or more path segments.

According to yet other examples, the method may include assigning substantially equal probability to the plurality of path segments upon initialization of the game.

According to other examples, cloud-based game server for predictively caching game content data may include a memory, a processor coupled to the memory. The processor may be configured to identify a plurality of path segments that can be taken by a player during a game, determine a probability of the player taking a subset of the path segments based on at least one from a set of: a current action by the player, a location of the player, a first action by the player, a game history of the player, a game history of a plurality of players, and/or a first action by the plurality of players, render one or more of the path segments in the subset of path segments based on their respective probabilities, and transmit the rendered one or more path segments to a game client to be cached at the game client.

According to some examples, the processor may be configured to transmit a path segment with a highest probability.

According to some examples, the processor may be configured to render the one or more path segments with varying display quality in proportion to their respective probabilities, and transmit the one or more path segments with the varying display quality.

According to some examples, the display quality may include at least one from a set of: a resolution, a number of frames per second, a rasterization, and/or a shading.

According to other examples, the processor may be configured to select a number of rendered path segments to transmit based on at least one from a set of: an available bandwidth, a size of game client cache, and/or a number of active players.

According to other examples, the processor may be configured to update a probability of the player taking another subset of the path segments based on at least one from a set of: another action by the player, another location of the player, the game history of the player, and/or the game history of a plurality of players as the player progresses through the game, render one or more of the path segments in the other subset of path segments based on their respective probabilities, and transmit the rendered one or more path segments to the game client to be cached at the game client.

According to further examples, the processor may be configured to employ data mining or crowdsourcing the game history of the plurality of players to identify the path segments and/or to determine the probability.

According to further examples, the processor may be configured to determine the probability of the player taking the subset of the path segments further based on a set of pre-defined probabilities specified by a game developer and stored in game content data upon initial game setup.

According to some examples, the processor may be configured to determine the probability of the player taking the subset of the path segments further based on a set of pre-defined probabilities stored in game content data and updated by a game content update.

According other examples, the processor may be configured to remove unused game content data from a cache on the game client, and replace the unused game content data with game content data for a new set of one or more path segments.

According to yet other examples, the processor may be configured to assign substantially equal probability to the plurality of path segments upon initialization of the game.

According to further examples, a computer-readable storage medium may have instructions stored thereon for predictive caching in cloud-based game. The instructions may include identifying a plurality of path segments that can be taken by a player during a game, determining a probability of the player taking a subset of the path segments based on at least one from a set of: a current action by the player, a location of the player, a first action by the player, a game history of the player, a game history of a plurality of players, and/or a first action by the plurality of players, rendering one or more of the path segments in the subset of path segments based on their respective probabilities, and transmitting the rendered one or more path segments to a game client to be cached at the game client.

According to some examples, the instructions may include transmitting a path segment with a highest probability.

According to other examples, the instructions may include rendering the one or more path segments with varying display quality in proportion to their respective probabilities, and transmitting the one or more path segments with the varying display quality. The display quality may include at least one from a set of: a resolution, a number of frames per second, a rasterization, and/or a shading.

According to some examples, the instructions may include selecting a number of rendered path segments to transmit based on at least one from a set of: an available bandwidth, a size of game client cache, and/or a number of active players.

According to further examples, the instructions may include updating a probability of the player taking another subset of the path segments based on at least one from a set of: another action by the player, another location of the player, the game history of the player, and/or the game history of a plurality of players as the player progresses through the game, rendering one or more of the path segments in the other subset of path segments based on their respective probabilities, and transmitting the rendered one or more path segments to the game client to be cached at the game client.

According to further examples, the instructions may include employing data mining or crowdsourcing the game history of the plurality of players to identify the path segments and/or to determine the probability.

According to some examples, determining the probability of the player taking the subset of the path segments may be based on a set of pre-defined probabilities specified by a game developer and stored in game content data upon initial game setup.

According to other examples, determining the probability of the player taking the subset of the path segments is further based on a set of pre-defined probabilities stored in game content data and updated by a game content update.

According to further examples, the instructions may include removing unused game content data from a cache on the game client, and replacing the unused game content data with game content data for a new not of one or more path segments.

According to yet other examples, the instructions may include assigning substantially equal probability to the plurality of path segments upon initialization of the game.

According to yet other examples, a game client for caching predicted game content data may include a memory and a processor coupled to the memory. The processor may be configured to receive one or more rendered path segments from a game server for caching locally. The path segments may be rendered by identifying a plurality of path segments that can be taken by a player during a game, determining a probability of the player taking a subset of the path segments based on at least one from a set of: a current action by the player, a location of the player, a first action by the player, a game history of the player, a game history of a plurality of players, and/or a first action by the plurality of players, and rendering the one or more of the path segments in the subset of path segments based on their respective probabilities.

According to some examples, the processor may be configured to receive a path segment with a highest probability.

According to some examples, the processor may be configured to receive the one or more path segments with varying display quality, the one or more path segments being rendered at the game server with the varying display quality in proportion to their respective probabilities.

According to other examples, the display quality may include at least one from a set of: a resolution, a number of frames per second, a rasterization, and/or a shading.

According to other examples, a number of rendered path segments to be transmitted may be selected at the game server based on at least one from a set of: an available bandwidth, a size of game client cache, and/or a number of active players.

According to further examples, a probability of the player taking another subset of the path segments may be updated at the game server based on at least one from a set of: another action by the player, another location of the player, the game history of the player, and/or the game history of a plurality of players as the player progresses through the game.

According to further examples, the processor may be configured to remove unused game content data from a cache on the game client, and replace the unused game content data with game content data for a new set of one or more path segments.

According to yet other examples, the game client may be one of: a desktop computer, a laptop computer, a vehicle-mount computer, a handheld computer, a multi-purpose computing device, and a game device.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g. as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to predictively cache in a cloud-based game, the method comprising:
   identifying path segments that can be taken by a player during a game;
   in response to a determination of an availability of a game history of the player, determining a probability of the player taking a subset of the path segments based on the game history of the player;
   rendering one or more of the path segments in the subset of path segments based on the probability, wherein each of the one or more path segments rendered is in a display quality proportional to the probability;
   in response to a determination of an unavailability of the game history of the player, assigning an equal probability of a selection of one of the subset of the path segments as the probability of the player taking the subset of the path segments, wherein the subset of the path segments are rendered in an equal display quality based on the equal probability;
   transmitting the rendered one or more path segments with the display quality to a game client to be cached at a game client cache of the game client;
   removing an unused portion of a game content data from the game client cache; and
   replacing the unused portion with the rendered one or more path segments.

2. The method of claim 1, further comprising transmitting a path segment with a highest probability.

3. The method of claim 1, further comprising:
   selecting a number of the rendered one or more path segments to transmit based on at least one of: an available bandwidth, a size of game client cache, and a number of active players.

4. The method of claim 1, further comprising:
   updating the probability of the player taking another subset of the path segments based on the game history of the player;
   rendering one or more of the path segments in the other subset of the path segments based on the probability; and
   transmitting the rendered one or more path segments to the game client to be cached at the game client cache.

5. The method of claim 1, further comprising:

determining the probability of the player taking the subset of the path segments based on a set of pre-defined probabilities specified by a game developer and stored in the game content data upon initial game setup.

6. A cloud-based game server for predictively caching game content data, the server comprising:
a memory; and
a processor coupled to the memory, the processor configured to:
identify path segments that can be taken by a player during a game;
in response to a determination of an availability of a game history of the player, determine a probability of the player taking a subset of the path segments based on the game history of the player;
render one or more of the path segments in the subset of path segments based on the probability, wherein each of the one or more path segments rendered is in a display quality proportional to the probability;
in response to a determination of an unavailability of the game history of the player, assign an equal probability of a selection of one of the subset of the path segments as the probability of the player taking the subset of the path segments, wherein the subset of the path segments are rendered in an equal display quality based on the equal probability;
transmit the rendered one or more path segments with the display quality to a game client to be cached at the game client cache of the game client;
remove an unused portion of a game content data from the game client cache; and
replace the unused portion with the rendered one or more path segments.

7. The server of claim 6, wherein the processor is further configured to:
assign a substantially equal probability to the one or more path segments upon initialization of the game.

8. The server of claim 6, wherein the processor is further configured to:
select a number of the rendered one or more path segments to transmit based on at least one of: an available bandwidth, a size of game client cache, and a number of active players.

9. The server of claim 6, wherein the processor is further configured to:
employ one of: data mining and crowd-sourcing to the game history of the player to identify the one or more path segments and to determine the probability.

10. The server of claim 6, wherein the processor is further configured to:
determine the probability of the player taking the subset of the path segments further based on a set of pre-defined probabilities specified by a game developer and stored in the game content data upon initial game setup.

11. The server of claim 6, wherein the processor is further configured to:
determine the probability of the player taking the subset of the path segments further based on a set of pre-defined probabilities stored in the game content data and updated by a game content update.

12. A non-transitory computer-readable storage medium having instructions stored thereon to predictively cache in a cloud-based game, the instructions comprising:
identifying a path segments that can be taken by a player during a game;
in response to a determination of an availability of a game history of the player, determining a probability of the player taking a subset of the path segments based on the game history of the player;
rendering one or more of the path segments in the subset of path segments based on the probability, wherein each of the one or more path segments rendered is in a display quality proportional to the probability;
in response to a determination of an unavailability of the game history of the player, assigning an equal probability of a selection of one of the subset of the path segments as the probability of the player taking the subset of the path segments, wherein the subset of the path segments are rendered in an equal display quality based on the equal probability;
transmitting the rendered one or more path segments with the display quality to a game client to be cached at a game client cache of the game client;
removing an unused portion of a game content data from the game client cache; and
replacing the unused portion with the rendered one or more path segments.

13. The non-transitory computer-readable storage medium of claim 12, wherein the display quality includes at least one of: a resolution, a number of frames per second, a rasterization, and a shading.

14. The non-transitory computer-readable storage medium of claim 12, wherein the instructions further comprise:
updating the probability of the player taking another subset of the path segments based on the game history of the player;
rendering the one or more path segments with the display quality in proportion to the probability; and
transmitting the one or more path segments with the display quality.

15. The non-transitory computer-readable storage medium of claim 12, wherein determining the probability of the player taking the subset of the path segments is further based on a set of pre-defined probabilities specified by a game developer and stored in one of: game content data upon initial game setup or stored in game content data and updated by a game content update.

16. The non-transitory computer-readable storage medium of claim 12, wherein the instructions further comprise assigning the equal probability to the path segments upon initialization of the game.

17. A game client to cache predicted game content data, the game client comprising:
a memory; and
a processor coupled to the memory, the processor configured to:
receive one or more rendered path segments from a game server to cache locally, wherein the one or more path segments are rendered by:
identifying the one or more path segments that can be taken by a player during a game;
in response to a determination of an availability of a game history of the player, determining a probability of the player taking a subset of the path segments based on the game history of the player;
rendering one or more of the path segments in the subset of the path segments based on the probability, wherein each of the one or more path segments rendered is in a display quality proportional to the probability;
in response to a determination of an unavailability of the game history of the player, assigning an equal probability of a selection of one of the subset of the path segments as the probability of the player taking the subset of the path segments, wherein the subset of the path segments are rendered in an equal display quality based on the equal probability;

removing an unused portion of a game content data from a game client cache of the game client; and replacing the unused portion with the rendered one or more of the path segments.

18. The game client of claim 17, wherein the game client is one of: a desktop computer, a laptop computer, a vehicle-mount computer, a handheld computer, a multi-purpose computing device, and a game device.

\* \* \* \* \*